United States Patent
Britton et al.

(10) Patent No.: US 7,640,239 B2
(45) Date of Patent: Dec. 29, 2009

(54) METHODS AND APPARATUS FOR REAL-TIME BUSINESS VISIBILITY USING PERSISTENT SCHEMA-LESS DATA STORAGE

(75) Inventors: Colin P. Britton, Lexington, MA (US); Amir Azmi, Billerica, MA (US); Ashok Kumar, North Billerica, MA (US); Noah W. Kaufman, Cambridge, MA (US); Chandra Bajpai, Natick, MA (US); Robert F. Angelo, Sudbury, MA (US); David A. Bigwood, Sudbury, MA (US)

(73) Assignee: Metatomix, Inc., Dedham, MA (US)

( * ) Notice: Subject to any disclaimer, the term of this patent is extended or adjusted under 35 U.S.C. 154(b) by 202 days.

(21) Appl. No.: 11/029,164

(22) Filed: Jan. 4, 2005

(65) Prior Publication Data

US 2005/0228805 A1    Oct. 13, 2005

Related U.S. Application Data

(63) Continuation of application No. 10/051,619, filed on Oct. 29, 2001, now Pat. No. 6,856,992, which is a continuation-in-part of application No. 09/917,264, filed on Jul. 27, 2001, now Pat. No. 7,058,637.

(51) Int. Cl.
*G06F 7/00* (2006.01)
*G06F 17/00* (2006.01)
(52) U.S. Cl. ....................................................... 707/5
(58) Field of Classification Search .................. None
See application file for complete search history.

(56) References Cited

U.S. PATENT DOCUMENTS

| | | | |
|---|---|---|---|
| 4,701,130 A | 10/1987 | Whitney et al. | |
| 4,895,518 A | 1/1990 | Arnold et al. | |
| 4,953,106 A | 8/1990 | Gansner et al. | |
| 5,119,465 A | 6/1992 | Jack et al. | |
| 5,129,043 A | 7/1992 | Yue | |
| 5,199,068 A | 3/1993 | Cox | |

(Continued)

FOREIGN PATENT DOCUMENTS

EP        1132847        9/2001

(Continued)

OTHER PUBLICATIONS

Larry Kerschberg. Knowledge Management in Heterogeneous Data Warehouse Environments. Pub. 2001.*

(Continued)

*Primary Examiner*—John E Breene
*Assistant Examiner*—Aleksandr Kerzhner
(74) *Attorney, Agent, or Firm*—Nutter McClennen & Fish LLP; David J. Powsner

(57) ABSTRACT

The invention provides methods for enterprise business visibility that transform any of marketing, e-commerce and transactional from a plurality of legacy and other databases into resource description framework (RDF) syntax. This information can be time-stamped (e.g., with expiration dates) and stored in a central data store. Answers to queries are discerned by applying genetic algorithm-based search techniques to the holographic store, with the confidence levels of those answers is based in part, for example, on the timestamps of the triples.

8 Claims, 8 Drawing Sheets

U.S. PATENT DOCUMENTS

| | | | |
|---|---|---|---|
| 5,259,766 A | 11/1993 | Sack et al. | |
| 5,267,865 A | 12/1993 | Lee et al. | |
| 5,270,920 A | 12/1993 | Pearse et al. | |
| 5,301,270 A | 4/1994 | Steinberg et al. | |
| 5,310,349 A | 5/1994 | Daniels et al. | |
| 5,311,422 A | 5/1994 | Loftin et al. | |
| 5,326,270 A | 7/1994 | Ostby et al. | |
| 5,333,254 A | 7/1994 | Robertson | |
| 5,339,390 A | 8/1994 | Robertson et al. | |
| 5,374,932 A | 12/1994 | Wyschogrod et al. | |
| 5,379,387 A | 1/1995 | Carlstedt | |
| 5,381,332 A | 1/1995 | Wood | |
| 5,395,243 A | 3/1995 | Lubin et al. | |
| 5,421,730 A | 6/1995 | Lasker, III et al. | |
| 5,450,480 A | 9/1995 | Man et al. | |
| 5,463,682 A | 10/1995 | Fisher et al. | |
| 5,499,293 A | 3/1996 | Behram et al. | |
| 5,519,618 A | 5/1996 | Kastner et al. | |
| 5,548,506 A | 8/1996 | Srinivasan | |
| 5,579,486 A | 11/1996 | Oprescu et al. | |
| 5,597,312 A | 1/1997 | Bloom et al. | |
| 5,608,789 A | 3/1997 | Fisher et al. | |
| 5,655,118 A | 8/1997 | Heindel et al. | |
| 5,732,192 A | 3/1998 | Malin et al. | |
| 5,745,753 A | 4/1998 | Mosher, Jr. | |
| 5,761,063 A | 6/1998 | Jannette et al. | |
| 5,765,140 A | 6/1998 | Knudson et al. | |
| 5,788,504 A | 8/1998 | Rice et al. | |
| 5,795,155 A | 8/1998 | Morrel-Samuels | |
| 5,809,212 A | 9/1998 | Shasha | |
| 5,822,780 A | 10/1998 | Schutzman | |
| 5,826,077 A | 10/1998 | Blakeley et al. | |
| 5,826,252 A | 10/1998 | Wolters, Jr. et al. | |
| 5,829,983 A | 11/1998 | Koyama et al. | |
| 5,832,483 A | 11/1998 | Barker | |
| 5,841,673 A | 11/1998 | Kobayashi et al. | |
| 5,873,076 A | 2/1999 | Barr et al. | |
| 5,875,441 A | 2/1999 | Nakatsuyama et al. | |
| 5,881,269 A | 3/1999 | Dobbelstein | |
| 5,907,837 A | 5/1999 | Ferrel et al. | |
| 5,935,249 A | 8/1999 | Stern et al. | |
| 5,974,441 A | 10/1999 | Rogers et al. | |
| 5,974,443 A | 10/1999 | Jeske | |
| 5,983,267 A | 11/1999 | Shklar et al. | |
| 5,987,415 A | 11/1999 | Breese et al. | |
| 5,995,958 A | 11/1999 | Xu | |
| 6,012,098 A | 1/2000 | Bayeh et al. | |
| 6,035,412 A | 3/2000 | Tamer et al. | |
| 6,044,373 A | 3/2000 | Gladney et al. | |
| 6,044,466 A | 3/2000 | Anand et al. | |
| 6,078,982 A | 6/2000 | Du et al. | |
| 6,085,188 A | 7/2000 | Bachmann et al. | |
| 6,094,652 A | 7/2000 | Faisal | |
| 6,122,632 A | 9/2000 | Botts et al. | |
| 6,125,363 A | 9/2000 | Buzzeo et al. | |
| 6,130,679 A | 10/2000 | Chen et al. | |
| 6,137,797 A | 10/2000 | Bass et al. | |
| 6,144,997 A | 11/2000 | Lamming et al. | |
| 6,151,595 A | 11/2000 | Pirolli et al. | |
| 6,151,624 A | 11/2000 | Teare et al. | |
| 6,154,738 A | 11/2000 | Call | |
| 6,177,932 B1 | 1/2001 | Galdes et al. | |
| 6,182,085 B1 | 1/2001 | Eichstaedt et al. | |
| 6,185,516 B1 | 2/2001 | Hardin et al. | |
| 6,185,534 B1 | 2/2001 | Breese et al. | |
| 6,212,502 B1 | 4/2001 | Ball et al. | |
| 6,240,417 B1 | 5/2001 | Eastwick et al. | |
| 6,243,713 B1 | 6/2001 | Nelson et al. | |
| 6,246,320 B1 | 6/2001 | Monroe | |
| 6,266,668 B1 * | 7/2001 | Vanderveldt et al. | 707/10 |
| 6,308,163 B1 | 10/2001 | Du et al. | |
| 6,330,554 B1 | 12/2001 | Altschuler et al. | |
| 6,341,277 B1 * | 1/2002 | Coden et al. | 707/2 |
| 6,360,330 B1 | 3/2002 | Mutalik et al. | |
| 6,369,819 B1 | 4/2002 | Pitkow et al. | |
| 6,380,910 B1 | 4/2002 | Moustakas et al. | |
| 6,381,738 B1 | 4/2002 | Choi et al. | |
| 6,389,429 B1 * | 5/2002 | Kane et al. | 707/200 |
| 6,389,460 B1 | 5/2002 | Stewart et al. | |
| 6,393,423 B1 * | 5/2002 | Goedken | 707/10 |
| 6,396,885 B1 | 5/2002 | Ding et al. | |
| 6,405,211 B1 | 6/2002 | Sokol et al. | |
| 6,405,251 B1 | 6/2002 | Bullard et al. | |
| 6,415,283 B1 | 7/2002 | Conklin | |
| 6,418,413 B2 * | 7/2002 | DeMarcken et al. | 705/5 |
| 6,418,448 B1 * | 7/2002 | Sarkar | 707/104.1 |
| 6,426,723 B1 | 7/2002 | Smith et al. | |
| 6,427,151 B1 | 7/2002 | Chan et al. | |
| 6,429,870 B1 | 8/2002 | Chen et al. | |
| 6,437,799 B1 | 8/2002 | Shinomi et al. | |
| 6,446,200 B1 | 9/2002 | Ball et al. | |
| 6,446,256 B1 | 9/2002 | Hyman et al. | |
| 6,463,440 B1 | 10/2002 | Hind et al. | |
| 6,473,467 B1 | 10/2002 | Wallace et al. | |
| 6,493,331 B1 | 12/2002 | Walton et al. | |
| 6,493,339 B1 | 12/2002 | Axelsson et al. | |
| 6,493,399 B1 | 12/2002 | Xia et al. | |
| 6,496,833 B1 * | 12/2002 | Goldberg et al. | 707/102 |
| 6,509,898 B2 | 1/2003 | Chi et al. | |
| 6,529,899 B1 | 3/2003 | Kraft et al. | |
| 6,530,079 B1 | 3/2003 | Midkiff et al. | |
| 6,539,374 B2 | 3/2003 | Jung | |
| 6,542,912 B2 | 4/2003 | Meltzer et al. | |
| 6,546,406 B1 | 4/2003 | DeRose et al. | |
| 6,556,983 B1 | 4/2003 | Altschuler et al. | |
| 6,571,222 B1 | 5/2003 | Matsumoto et al. | |
| 6,577,769 B1 | 6/2003 | Kenyon et al. | |
| 6,583,800 B1 | 6/2003 | Ridgley et al. | |
| 6,594,662 B1 | 7/2003 | Sieffert et al. | |
| 6,598,043 B1 | 7/2003 | Baclawski | |
| 6,606,613 B1 | 8/2003 | Altschuler et al. | |
| 6,625,657 B1 | 9/2003 | Bullard | |
| 6,636,848 B1 * | 10/2003 | Aridor et al. | 707/3 |
| 6,640,284 B1 * | 10/2003 | Shaw et al. | 711/129 |
| 6,643,638 B1 | 11/2003 | Xu | |
| 6,643,652 B2 | 11/2003 | Helgeson et al. | |
| 6,678,679 B1 | 1/2004 | Bradford | |
| 6,701,314 B1 * | 3/2004 | Conover et al. | 707/10 |
| 6,721,747 B2 | 4/2004 | Lipkin | |
| 6,725,227 B1 | 4/2004 | Li | |
| 6,751,663 B1 | 6/2004 | Farrell et al. | |
| 6,754,475 B1 | 6/2004 | Harrison et al. | |
| 6,757,708 B1 * | 6/2004 | Craig et al. | 709/203 |
| 6,771,706 B2 | 8/2004 | Ling et al. | |
| 6,772,148 B2 | 8/2004 | Baclawski | |
| 6,778,971 B1 | 8/2004 | Altschuler et al. | |
| 6,785,341 B2 | 8/2004 | Walton et al. | |
| 6,792,420 B2 | 9/2004 | Stephen Chen et al. | |
| 6,804,688 B2 * | 10/2004 | Kobayashi et al. | 707/203 |
| 6,901,438 B1 * | 5/2005 | Davis et al. | 709/219 |
| 6,925,457 B2 | 8/2005 | Britton et al. | |
| 6,927,728 B2 | 8/2005 | Vook et al. | |
| 6,934,702 B2 | 8/2005 | Faybishenko et al. | |
| 6,940,917 B2 | 9/2005 | Menon et al. | |
| 7,047,411 B1 * | 5/2006 | DeMello et al. | 713/176 |
| 7,058,367 B1 | 6/2006 | Luo et al. | |
| 7,058,637 B2 | 6/2006 | Britton et al. | |
| 7,117,260 B2 * | 10/2006 | Bimson et al. | 709/223 |
| 7,171,145 B2 | 1/2007 | Takeuchi et al. | |
| 7,171,415 B2 * | 1/2007 | Kan et al. | 707/10 |
| 7,289,793 B2 | 10/2007 | Norwood et al. | |
| 7,313,588 B1 | 12/2007 | Shotton, Jr. et al. | |
| 2001/0047355 A1 | 11/2001 | Anwar | |
| 2002/0042831 A1 | 4/2002 | Capone et al. | |

| | | | |
|---|---|---|---|
| 2002/0049603 | A1 | 4/2002 | Mehra et al. |
| 2002/0049788 | A1 | 4/2002 | Lipkin et al. |
| 2002/0059566 | A1* | 5/2002 | Delcambre et al. .......... 717/146 |
| 2002/0069134 | A1* | 6/2002 | Solomon ...................... 705/26 |
| 2002/0078030 | A1 | 6/2002 | Iwayama et al. |
| 2002/0091678 | A1 | 7/2002 | Miller et al. |
| 2002/0091835 | A1 | 7/2002 | Lentini et al. |
| 2002/0118688 | A1 | 8/2002 | Jagannathan |
| 2002/0120598 | A1* | 8/2002 | Shadmon et al. ............... 707/1 |
| 2002/0133502 | A1 | 9/2002 | Rosenthal et al. |
| 2002/0143759 | A1* | 10/2002 | Yu ................................ 707/5 |
| 2002/0178170 | A1 | 11/2002 | Britton et al. |
| 2002/0178232 | A1 | 11/2002 | Ferguson |
| 2003/0004934 | A1 | 1/2003 | Qian |
| 2003/0009239 | A1 | 1/2003 | Lombardo |
| 2003/0014399 | A1 | 1/2003 | Hansen et al. |
| 2003/0037145 | A1 | 2/2003 | Fagan |
| 2003/0050834 | A1 | 3/2003 | Caplan |
| 2003/0050927 | A1 | 3/2003 | Hussam |
| 2003/0050929 | A1 | 3/2003 | Bookman et al. |
| 2003/0061209 | A1 | 3/2003 | Raboczi et al. |
| 2003/0074352 | A1 | 4/2003 | Raboczi et al. |
| 2003/0074369 | A1 | 4/2003 | Schuetze et al. |
| 2003/0088639 | A1 | 5/2003 | Lentini et al. |
| 2003/0109951 | A1 | 6/2003 | Hsiung et al. |
| 2003/0158841 | A1 | 8/2003 | Britton et al. |
| 2003/0158851 | A1 | 8/2003 | Bigwood et al. |
| 2003/0208499 | A1 | 11/2003 | Bigwood et al. |
| 2003/0229529 | A1 | 12/2003 | Mui et al. |
| 2004/0034651 | A1* | 2/2004 | Gupta et al. ................ 707/102 |
| 2004/0073545 | A1 | 4/2004 | Greenblatt et al. |
| 2005/0027563 | A1 | 2/2005 | Fackler et al. |
| 2005/0055330 | A1 | 3/2005 | Britton et al. |
| 2005/0060372 | A1 | 3/2005 | DeBettencourt et al. |
| 2005/0125683 | A1 | 6/2005 | Matsuyama et al. |

FOREIGN PATENT DOCUMENTS

| | | |
|---|---|---|
| WO | WO-9722096 | 6/1997 |
| WO | WO-9805018 | 2/1998 |
| WO | WO-9810399 | 3/1998 |
| WO | WO-9824020 | 6/1998 |
| WO | WO-9927460 | 6/1999 |

OTHER PUBLICATIONS

Gregory Karvounarakis et al. Querying Community Web Portals. Sigmod Pub. Pub. 2000.*
Bernd Amann et al. Integrating ontologies and thesauri for RDF schema creation and metadata querying. Mar. 6, 2001.*
Resource Description Framework (RDF) Model and Syntax Specification. W3C Recommendation. Feb. 22, 1999.*
C Jenkins, M Jackson, P Burden, J Wallis—Computer Networks, 1999. Automatic RDF metadata generation for resource discovery.*
"Inkling: RDF Query Using SquishQL," downloaded from http://swordfish.rdfweb.org/rdfquery/ on Mar. 20, 2003, 2 pages.
"rdfDB Query Language", downloaded from http://www.guha.com/rdfdb/query.html on Mar. 20, 2003, 4 pages.
"RDQL—RDF Data Query Langauge," Hewlett-Packard Company, © 1994-2003, downloaded from http://www.hpl.hp.com/semweb/rdql.htm on Mar. 20, 2003, 3 pages.
Berniers-Lee et al. RFC 2396: Uniform Resouece Identifiers (URI): Generic Syntax (Aug. 1998) http://www.cs.tut.fi/~jkorpela/rfc/2396/full.html, 23 pages, downloaded on Feb. 20, 2003.
Forgy, Charles L. "Rete: A Fast Algorithm for the Many Pattern/Many Object Pattern Match Problem," Artificial Intelligence vol. 19 (1982) pp. 17-37.
Melnik, Sergey, "Storing RDF in a relational database," http://www-db.stanford.edu/~melnik/rdf/db.html, 5 pages, downloaded Feb. 20, 2003.
Quinlan, J.R., "Induction of Decision Trees," Machine Learning vol. 1 (1986) pp. 18-106.

Resource Description Framework (RDF) Model and Syntax Specification W3C Recommendation (Feb. 22, 1999) http://www.w3.org. TR/1999/REC-rdf-syntax-19990222/, 34 pages, downloaded on Feb. 20, 2003.
"The Rete Algorithm," http://herzberg.ca.sandia.gov/jess/docs/52/rete.html, 3 pages, dowloaded on Feb. 20, 2003.
PHIN: "Public Health Information Network Functions and Specification Version 1.2," pp. 1-56, Dec. 18, 2002.
Yasnoff, W., et al., "Public Health Informatics: Improving and Transforming Public Health in the Information Age," *Topics in Health Information Management*, vol. 21, Issue 3, pp. 44-51, Feb. 2001.
National Electronic Disease Surveillance System (NEDSS): A Standards-Based Approach to Connect Public Health and Clinical Medicine, Journal of Public Health Management and Practice, vol. 7(6), pp. 43-50, Nov. 2001.
Delcambre, L., et al., "Bundles in Captivity: An Application of Superimposed Information," Proceedings 17$^{th}$ International Conference on Data Engineering, vol. CONF. 17, pp. 111-120, Apr. 2-6, 2001.
Manola, F., "Towards a Richer Web Object Model," SIGMOD Record, vol. 27, No. 1, pp. 76-80, Mar. 1998.
"An Overview of the NEDSS Initiative", website for the Centers for Disease Control and Prevention, http://www.cdc.gov/nedss/About/overview.html, printed Nov. 14, 2005, 2 pages.
"Background on Public Health Surveillance", website for the Centers for Disease Control and Prevention, http://www.cdc.gov/nedss/About/purpose.htm, printed Nov. 14, 2005, 3 pages.
"Description of the NEDSS Base System," Mar. 28, 2001, 5 pages.
"Maestro™ Public Health Suite," Orion International website, http://www.orionhealth.com/maestro_overview.htm, printed Jan. 18, 2005, 3 pages.
"National Electronic Disease Surveillance System (NEDSS): A standards-Based Approach To Connect: Public Health and Clinical Medicine", J. Public Health Management Practice, 2001. 7(6], 43-508 pages.
"NEDSS and NEDSS PAMs Business Discovery Statement", Version 1.2, Mar. 9, 2002, 23 pages.
"NEDSS Base System Fact Sheet", website for the Centers for Disease Control and Prevention, 2 pages.
"NEDSS Logical Data Model (NLDM) Overview and Users' Guide", Version 1.0, 92 pages.
"NEDSS Systems Architecture", Version 2.0, Apr. 15, 2001, 5 pages.
"Overview of PHIN", Centers for Disease Control and Prevention website, http://www.cdc.gov/phin, printed Jan. 18, 2005, 3 pages.
"The Surveillance and Monitoring Component of the Public Health Information Network", website for the Centers for Disease Control and Prevention, http://www.cdc.gov/nedss, printed Nov. 14, 2005, 2 pages.
"Public Health Information Network", The Association of State and Territorial Health Officials website, http://www.astho.org/?template=public_health_info_network.html, printed Jan. 18, 2005, 2 pages.
Beckett, D. "The Design and Implementation of the Redland RDF Application Framework," Copyright WWW01 May 2-5, 2001. Retrieved from http:www10.org/cdrom/papers/490/.
Brickley, Dan et al. "SWIPE 0.1 specification" Pub. 2001. Retrieved from: http:rdfweb.org/2001/01/swipe/.
Brickley, Dan et al., "RDF, squish etc." Pub on the web Nov. 26, 2000. Retrieved from http://www.ilrtbris.ac.uk/discovery/2000/11/QL/QL.txt.
Card et al., "Readings in Information Visualizing Using Vision to Think", 1999, Morgan Kaufmann, p. 298.
Churchill, R. et al. "RDT Technical Overview" Mozilla.org. Last modified Nov. 1999. Retrieved from http://www.mozill.org/rdf/doc/api.html.
Delcambre et al., "Bundles in Captivity: An Application of Superimposed Information", IEEE 2001, pp. 111-120.
Gandon, Fabien et al. "A Multi-Agent System to Support Exploiting an XML-based Corporate Memory" INRIA, ACACI Project, 2004 Route des Lucioles, 06902 Sophia Antipolis, France, Proc. of the Third Int. Conf. on Practical Aspects of Knowledge Management (PAKM2000) Basel, Swwitzerland, Oct. 30-31, 2000, (U.Reimer, ed.).

Gray, M., "Semantic Labeling" Hive. May 14, 1999. Retrieved from: http://hive.sourceforge.net/rnkgray-thesis/html/node8.html.
Gregory Karvounarakis et al., "Querying Community Web Portals", Sigmod Pub, Pub. 2000.
Jenkins, C. et al., Computer Networks, 1999, Automatic RDF metadata generation for resource discovery.
Manola, "Towards a Richer Object Model", SIGMOD Record, vol. 27, No. 1, Mar. 1998, 6 pages.
Melnik et al. Representing Order in RDF. Pub. Jan. 7, 2001. Retrieved from:http://infolab.stanford.edu/~stefan/daml/order.html.
Miller, Eric et al., RDF Primer, W3C @@ Editor's Draft Jan. 27, 2002 @@, CopyrightA © 2001, 2002 A® (MIT,INRIA,Keio) (22 pages).
Miller, L., "Aggregating Recommendations Using RDF," ILRT. Org. Pub. Jan. 10, 1999.
Public Health Information Network Functions and Specifications, Version 1.2—Dec. 18, 2002; Draft; 56 pages.
Published International Search Report (published May 24, 2007) and Written Opinion (mailed Feb. 12, 2007) for PCT/US05/005725.
Rogers, Nikki, "SWAD-Europe deliverable 4.2: Semantic Web and Web Services: RDF/XML and SOAP for Web Data Encoding," Year 2001.
Six, Janet, M. et al, "Effective e Graph Visualization Via Node Grouping", Proceedings of the IEEE Symposium on Information Visualization 2001 (INFOVIS'01) (8 pages).
Supplemental European Search Report dated Aug. 8, 2007 (5 pages).
Yasnoff et al., "Public health informatics: Improving and transforming public health in the information age" Topics in Health Information Management, Frederick; Aspen Publishers; Feb. 2001; 8 pages.
Beckett, Dave Dave Beckett's Resource Description Framework (RDF) Resource Guide, available at http://planetrdf.com/guide, last updated Sep. 23, 2005, 26 pages.
Berners-Lee et al "Web Architecture: Describing and Exchanging Data," W3C Recommendations, Jun. 7, 1999, http://www.w3.org/1999/06/07-WebData.
Berners-Lee, "Semantic Web Road Map," W3C Recommendations, Sep. 1998, http://www.w3.org/DesignIssues/Semantic.html.
Berners-Lee, "What a semantic web can represent," W3C Recommendations, Sep. 1998.
Berners-Lee, Tim "Information Management: A Proposal," Mar. 1989, May 1990; 14 pages.
Berniers-Lee et al, "The Enquire Manual," Oct. 1980, http://infomesh.net/2001/enquire/manual/.
Bonifati, "Comparative Analysis of Five XML Query Languages," SIGMOD Record, vol. 29, No. 1, Mar. 2000.
Bray, Tim et al. "Extensible Markup Language," W3C Recommendations, Feb. 10, 1998, http://www.w3.org/TR/1998/REC-xml-19980210.
Brickley, Dan "RDF Query in Javascript demo," W3C website, Jul. 28, 2001, http://www.w3.org/1999/11/11-WWWProposal/rdfqdemo.html.
Bucher, Alex et al. "Discovering Internet Marketing Intelligence through Online Analytical Web Usage Mining," SIGMOD Record, vol. 27, No. 4, Dec. 1998.
Buneman et al "Interaction between Path and Type Constraints" PODS 1999, pp. 56-67.
Carr, Leslie et al. "The Evolution of Hypertext Link Services," ACM Computing Surveys, vol. 31, No. 4es, Dec. 1999.
Chen, James et al "A Distributed Multi-Agent System for Collaborative Information Management and Sharing," RBAC 2000, Berlin, Germany ISBN 1-58113-259-x/00/07; 2000.
Clark, James Editor "XSL Transformations," W3C Recommendations, Nov. 16, 1999, http://www.w3.org/TR/xslt.
Conference Review Department, "Semantic Web Workshop: Models, Architectures and Management of Sep. 21, 2000" Intelligence, Summer 2001, pp. 39-44.
Cowan, John et al. "XML Information Set," W3C Recommendations, May 17, 1999, http://www.w3.org/TR/1999/WD-xml-infoset-19990517.
Crestani, Fabio "Vocal Access to a Newspaper Archive: Design Issues and Preliminary Investigations," International Computer Science Institute; Mar. 1999.
Dublin Core Metadata Initiative, available at http://dublincore.org, web page last updated Mar. 31, 2009, copyright 1995-2009; 1 page.
Extensible Markup Language (XML), W3C Sematic Web, http://www.w3.org/XML/ ; last updated Apr. 5, 2009; copyright 1996-2003; 5 pages.
Extensible Markup Language Activity Statement , W3C Ubiquitous Web, http://www.w3.org/XML/Activity; downloaded Apr. 10, 2009; 3 pages.
Fan, Wenfei, "Integrity Constraints for XML," ACM Symposium on Principles of Database Systems archive Proceedings of the nineteenth ACM SIGMOD-SIGACT-SIGART symposium on Principles of database systems; Dallas, Texas, United States; pp. 23-34 ; Year of Publication: 2000.
Fensel, D. "Ontobroker: Or How to Enable Intelligent Access to the WWW," Proceedings of the 11th Banff Knowledge Acquisition for Knowledge-Based System Workshop (KAW98), Banaff, Kanada, Apr. 1998.
Halpin, Harry et al "W3C Semantic Web Activity," W3C Sematic Web, http://www.w3.org/2001/sw/; last updated Apr. 6, 2009, copyright 1994-2009.
Kerstin Forsberg et al. Extensible use of RDF in a business context. Computer Networks: The International Journal of Computer and Telecommunications Networking. Published Jun. 2000.
Lassila, et al "Resource Description Framework (RDF) Model and Syntax Specification," W3C Recommendations, Feb. 22, 1999.
Ludascher, B. Gupta, A. Martone, M.E.Model-based mediation with domain maps. Data Engineering, 2001. Proceedings. 17th International Conference on Publication Date: 2001. pp. 81-90. Meeting Date: Apr. 02, 2001-Apr. 06, 2001.
M. R. Kogalovsky. Systematization of information resources collections in digital libraries. MAIK Nauka/Interperiodica distributed exclusively by Springer Science+Business Media LLC. vol. 26, No. 3 / May 2000.
Malhotra, Ashok et al., "XML Schema Requirements," W3C Note, Feb. 15, 1999, http://www.w3.org/TR/NOTE-xml-schema-req.
Manola, Frank Editor "RDF Primer," W3C Working Draft, Mar. 2002, http://www.w3.org/TR/2002/WD-rdf-primer-20020319/.
McGrath et al, "Digital Library Technology for Locating and Accessing Scientific Data," Internationalal Conference on Digital Libraries, Proceedings of the fourth ACM conference on Digital Libraries, Berkley, CA, United States, pp. 188-194, Year of Publication: 1999. ISBN: 1-58113-145-3.
Melnik, Sergey "Building a Distributed Full-Text Index of the Web," WWW10, May 1-5, 2001, Hong Kong ACM 1-58113-348-0/01/00005.
Melnik, Sergey "A Mediation Infrastructure for Digital Library Services," Digital Libraries, San Antonio, TX ACM 2000 -581 13-231 x/00/0006; 2000.
Ouksel, Aris et al. "Semantic Interoperability in Global Information Systems," SIGMOD Record, vol. 28, No. 1, Mar. 1999.
Prudhommeaux, Eric "Check and Visualize you RDF," W3C website, Feb. 15, 2007, http://www.w3.org/RDF/Validator/.
RDF Interest Group 1999-2004, available at W3C Semantic Web, http://www.w3.org/RDF/Interest/ ; last updated Dec. 8, 2005; downloaded Apr. 2009.
Resource Description Framework, (RDF) Schema Specification, W3C Proposed Recommendation Mar. 3, 1999, http://www.w3.org/TR/1999/PR-rdf-schema-19990303/.
S. Alexaki et al. Managing RDF Metadata for Community Webs. Springer Berlin / Heidelberg. vol. 1921/2000, pp. 140-151.
Semantic Web Workshop: Models, Architectures and Management, Sep. 21, 2000 Conference Review, Intelligence Summer 2001.
Suciu, Dan "Managing Web Data," AT&T Labs-Research, SIGMOD 1999, ISSN:0163-5808.
Swick, R. "The Cambridge Communique," W3C Recommendations, Oct. 1999, http://www.w3.org/TR/schema-arch.
Swick, Ralph, "RDF:Weaving the Web of Discovery," Putting it Together, Jun. 1999, pp. 21-25, Year of Publication: 1999, ISSN:1091-3556.
Sycara, Katia et al. "Dynamic Service Matchmaking Among Agents in Open Information," SIGMOD Record, vol. 28, No. 1, Mar. 1999.
Takeda, Koichi, "Site Outlining," IBM Research, Tokyo Research Lab, 1623-14.

Technical Reports and Communications, W3C website, http://www.w3.org/TR/ ; last updated Apr. 21, 2009; copyrighted 1994-2006.

Terence Critchlow. Report on XEWA-00: the XML enabled wide-area searches for bioinformatics workshop. ACM> vol. 30, Issue 1 (Mar. 2001).

Thomas Lee, et al "Information integration with attribution support for corporate profiles," Information integration with attribution support for corporate profiles, Conference on Information and Knowledge Management, Proceedings of the eighth international conference on Information and knowledge management , Kansas City, Missouri, United States ,pp. 423-429 ,Year of Publication: 1999 , ISBN:1-58113-146-1.

Thompson, Craig "Workshop on Compositional Software Architectures Workshop Report," Software Engineering Notes, vol. 23. No. 3, May 1998.

Tudhope et al "Semantically Indexed Hypermedia: Linking Information Disciplines," ACM Computing Surveys (CSUR), vol. 31 , Issue 4es (Dec. 1999), Article No. 4, Year of Publication: 1999 , ISSN:0360-0300 Tudhope et al "Semantically Indexed Hypermedia: Linking Information Disciplines," ACM 2000, www.comp.glam.ac.uk/people/staff/dstudhope.

Web site; http://www.w3.org/DesignIssues/RDFnot.html ; Sep. 27, 2004 ; 8 pages.

* cited by examiner

FIGURE 4
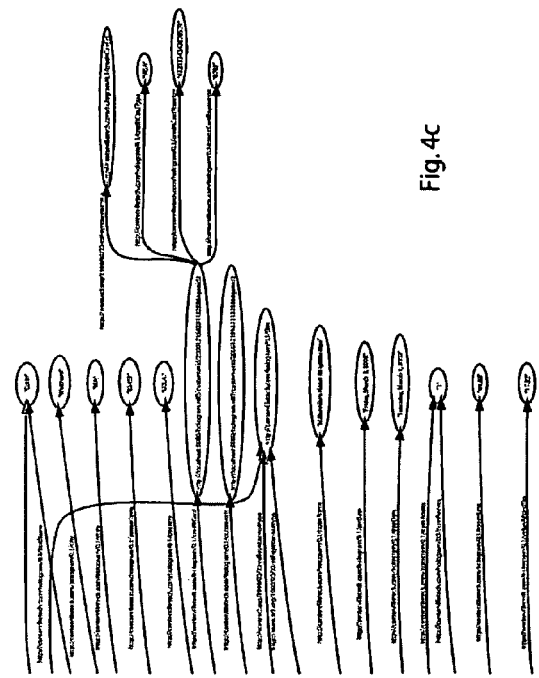
Fig. 4c
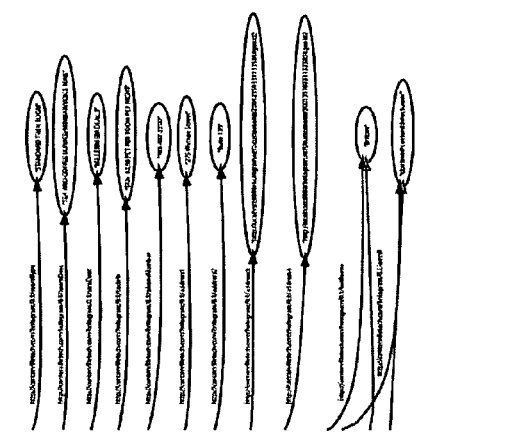
Fig. 4d
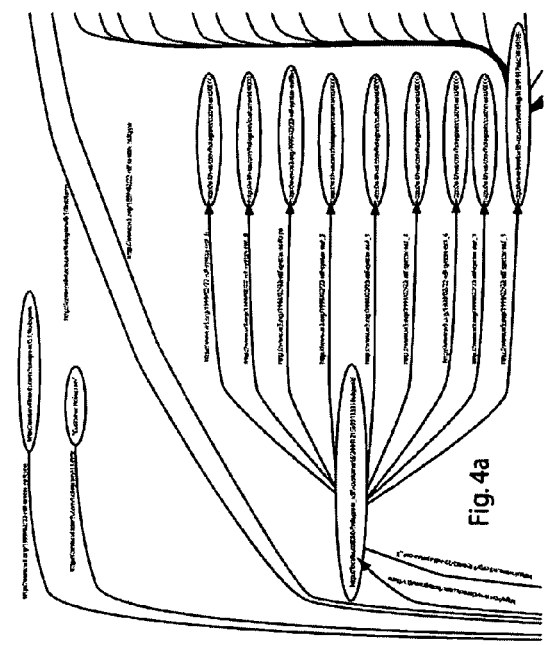
Fig. 4a
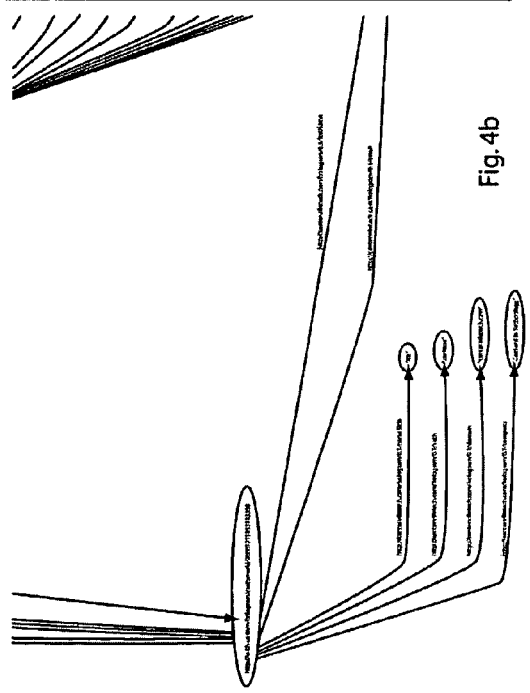
Fig. 4b

METHODS AND APPARATUS FOR REAL-TIME BUSINESS VISIBILITY USING PERSISTENT SCHEMA-LESS DATA STORAGE

This application is a continuation of U.S. Ser. No. 10/051,619, filed Oct. 29, 2001, entitled "Methods and Apparatus For Real-Time Business Visibility Using Persistent Schema-Less Data Storage," which claims the benefit of U.S. Provisional Patent Application Ser. No. 60/324,037, filed Sep. 21, 2001, entitled "Methods and Apparatus for Real-Time Business Visibility Using Persistent Schema-Less Data Storage" and claims the benefit of U.S. Provisional Patent Application Ser. No. 60/291,185, filed May 15, 2001, entitled "Methods and Apparatus for Enterprise Application Integration," and is a continuation-in-part of U.S. patent application Ser. No. 09/917,264, filed Jul. 27, 2001, entitled "Methods and Apparatus for Enterprise Application Integration." This application claims the benefit of priority of PCT Ser. No. US02/15698, filed May 15, 2002, entitled "Methods and Apparatus of Enterprise Application Integration" and PCT Ser. No. US 02/15721, filed May 15, 2002, entitled "Methods and Apparatus of Enterprise Application Integration." The teachings of all of the foregoing applications are incorporated herein by reference.

BACKGROUND OF THE INVENTION

The invention pertains to digital data processing and, more particularly, to methods and apparatus for enterprise business visibility and insight using real-time reporting tools.

It is not uncommon for a single company to have several database systems—separate systems not interfaced—to track internal and external planning and transaction data. Such systems might of been developed at different times throughout the history of the company and are therefore of differing generations of computer technology. For example, a marketing database system tracking customers may be ten years old, while an enterprise resource planning (ERP) system tracking inventory might be two or three years old. Integration between these systems is difficult at best, consuming specialized programming skill and constant maintenance expenses.

A major impediment to enterprise business visibility is the consolidation of these disparate legacy databases with one another and with newer e-commerce databases. For instance, inventory on-hand data gleaned from a legacy ERP system may be difficult to combine with customer order data gleaned from web servers that support e-commerce (and other web-based) transactions; This is not to mention difficulties, for example, in consolidating resource scheduling data from the ERP system with the forecasting data from the marketing database system.

An object of this invention is to provide improved methods and apparatus for digital data processing and, more particularly for enterprise business visibility and insight (hereinafter "enterprise business visibility").

A further object is to provide such methods and apparatus as can rapidly and accurately retrieve information responsive to user inquiries.

A further object of the invention is to provide such methods and apparatus as can be readily and inexpensively integrated with legacy, current and future database management systems.

A still further object of the invention is to provide such methods and apparatus as can be implemented incrementally or otherwise without interruption of enterprise operation.

Yet a still further object of the invention is to provide such methods and apparatus as to facilitate ready access to up-to-date enterprise data, regardless of its underlying source.

Yet still a further object of the invention is to provide such methods and apparatus as permit flexible presentation of enterprise data in an easily understood manner.

SUMMARY OF THE INVENTION

The aforementioned are among the objects attained by the invention, one aspect of which provides a method for enterprise business visibility that transforms transactional and other information from a plurality of legacy and other databases in resource description framework (RDF) syntax. This information can be time-stamped (e.g., with expiration dates) and stored in a central database, referred to below as a "holographic" data store.

Further aspects of the invention provide such methods for real-time enterprise business visibility and insight that uses software ("connectors") that can be instantiated via downloading (e.g., using Java® or other such technologies) to provide interfaces to respective disparate database systems. The databases systems may comprise any variety of now or heretofore known systems, e.g. SAP, Oracle, and so forth.

The connectors can, for example, translate between a native language (or Application Program Interface ("API")) of the respective database systems and an internal language/protocol of the enterprise business visibility system. To this end, the connectors can utilize a scripting language to access the respective database systems.

The connectors, according to further aspects of the invention, can query the respective database systems, using simple queries and/or using data mining techniques, based on requests received from the holographic data store and/or from a framework server, a user or otherwise. In related aspects, the data store is periodically updated via application of queries to the database systems.

Further aspects of the invention provide methods as described above in which a graph generator generates directed graphs from the RDF triples in the holographic store. The graphs can be "walked" in order to discern answers to queries for information reflected by triples originating from data in one or more of the databases, and the confidence levels of those answers based in part, for example, on the time-stamps of the underlying triples. In related aspects of the invention, answers to queries are discerned by applying genetic algorithm-based search techniques to the holographic store.

Another aspect of the invention provides methods as described above in which a framework server accepts queries, e.g., from a user, and formats them for application to the holographic data store.

Further aspects of the invention provide real-time enterprise business visibility and insight that operate in accord with the foregoing.

These and other aspects of the invention are evident in the drawings and in the description that follows.

BRIEF DESCRIPTION OF THE DRAWINGS

The foregoing features of this invention, as well as the invention itself, may be more fully understood from the following detailed description of the drawings in which:

FIG. 1 depicts an improved enterprise business visibility and insight system according invention;

FIG. 2 depicts operation of a software interface "connector" according to the invention;

DETAILED DESCRIPTION OF THE ILLUSTRATED EMBODIMENT

Figure 1:
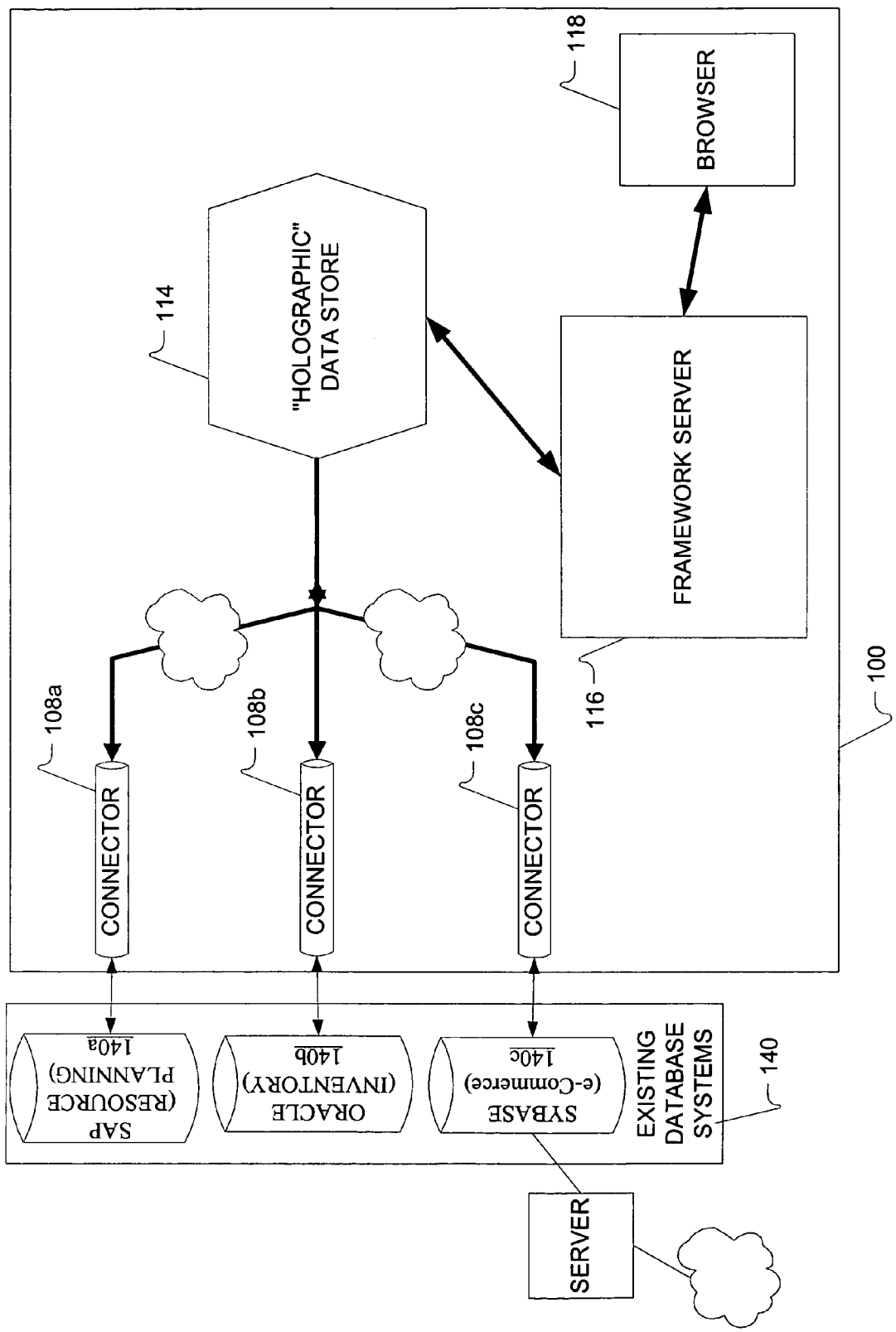

FIG. 1 depicts a real-time enterprise business visibility and insight system according to the invention. The illustrated system 100 includes connectors 108 that provide software interfaces to legacy, e-commerce and other databases 140 (hereinafter, collectively, "legacy databases"). A "holographic" database 114 (hereinafter, "data store" or "holographic data store"), which is coupled to the legacy databases 140 via the connectors 108, stores data from those databases 140. A framework server 116 accesses the data store 114, presenting selected data to (and permitting queries from) a user browser 118. The server 116 can also permit updates to data in the data store 114 and, thereby, in the legacy databases 140.

Legacy databases 140 represent existing (and future) databases and other sources of information in a company, organization or other entity (hereinafter "enterprise"). In the illustration, these include a retail e-commerce database (e.g., as indicated by the cloud and server icons adjacent database 140c) maintained with a Sybase® database management system, an inventory database maintained with an Oracle® database management system and an ERP database maintained with a SAP® Enterprise Resource Planning system. Of course, these are merely examples of the variety of databases or other sources of information with which methods and apparatus as described herein can be used. Common features of illustrated databases 140 are that they maintain information of interest to an enterprise and that they can be accessed via respective software application program interfaces (API) or other mechanisms known in the art.

Connectors 108 serve as an interface to legacy database systems 140. Each connector applies requests to, and receives information from, a respective legacy database, using that database's API or other interface mechanism. Thus, for example, connector 108a applies requests to legacy database 140a using the corresponding SAP API; connector 108b, to legacy database 140b using Oracle API; and connector 108c, to legacy database 140c using the corresponding Sybase API.

In the illustrated embodiment, these requests are for purposes of accessing data stored in the respective databases 140. The requests can be simple queries, such as SQL queries and the like (e.g., depending on the type of the underlying database and its API) or more complex sets of queries, such as those commonly used in data mining. For example, one or more of the connectors can use decision trees, statistical techniques or other query and analysis mechanisms known in the art of data mining to extract information from the databases.

Specific queries and analysis methodologies can be specified by the holographic data store 114 or the framework server 116 for application by the connectors. Alternatively, the connectors themselves can construct specific queries and methodologies from more general queries received from the data store 114 or server 116. For example, request-specific items can be "plugged" into query templates thereby effecting greater speed and efficiency.

Regardless of their origin, the requests can be stored in the connectors 108 for application and/or reapplication to the respective legacy databases 108 to provide one-time or periodic data store updates. For example, connectors can use expiration date information to determine which of a plurality of similar data to return, or if a date is absent, the connector can return the data with a lower confidence level.

Data and other information (collectively, "messages") generated by the databases 140 in response to the requests are routed by connectors to the holographic data store 114. That other information can include, for example, expiry or other adjectival data for use by the data store in caching, purging, updating and selecting data. Those messages can be cached by the connectors 108, though, they are preferably immediately routed to the store 114.

The software connectors 108 may reside on any digital data processing system(s) that is (are) in communications coupling—e.g., via a dial-up connection, bus, cable, network and/or Internet (as indicated by cloud icons), or otherwise—with the respective legacy databases 140 and with the holographic data store 114. Typically, the connectors reside on computers within the firewall (or other security barrier) of the enterprise, though, they may reside elsewhere (e.g., local to the holographic store 114 and/or the framework server 116).

In a preferred embodiment, the connectors are implemented as automatically compiling components in a J2EE framework, or the like. Depending on the legacy database from which information is being collected, on the type of query, and so forth, general- or specific-purpose connector modules can be electronically downloaded or otherwise remotely updated as required. Of course, the connectors can be implemented in software other than as components of a J2EE framework and can be configured to communicate with legacy peripheral and other hardware devices.

In embodiments, such as that illustrated here, wherein the connectors 108 are implemented as automatically compiling components in a J2EE framework, or the like, those connectors preferably execute within a suitable environment, e.g., utilizing Java virtual machines running scripted Extensible Markup Language ("XML") operating according Extensible Stylesheet Language Transformation ("XSLT") scripts. The use of XSLT scripts allow the connectors to communicate with a variety of database systems by merely downloading the XSLT using any computer readable medium, e.g. disk, electronic download, or CD-ROM.

Figure 2:
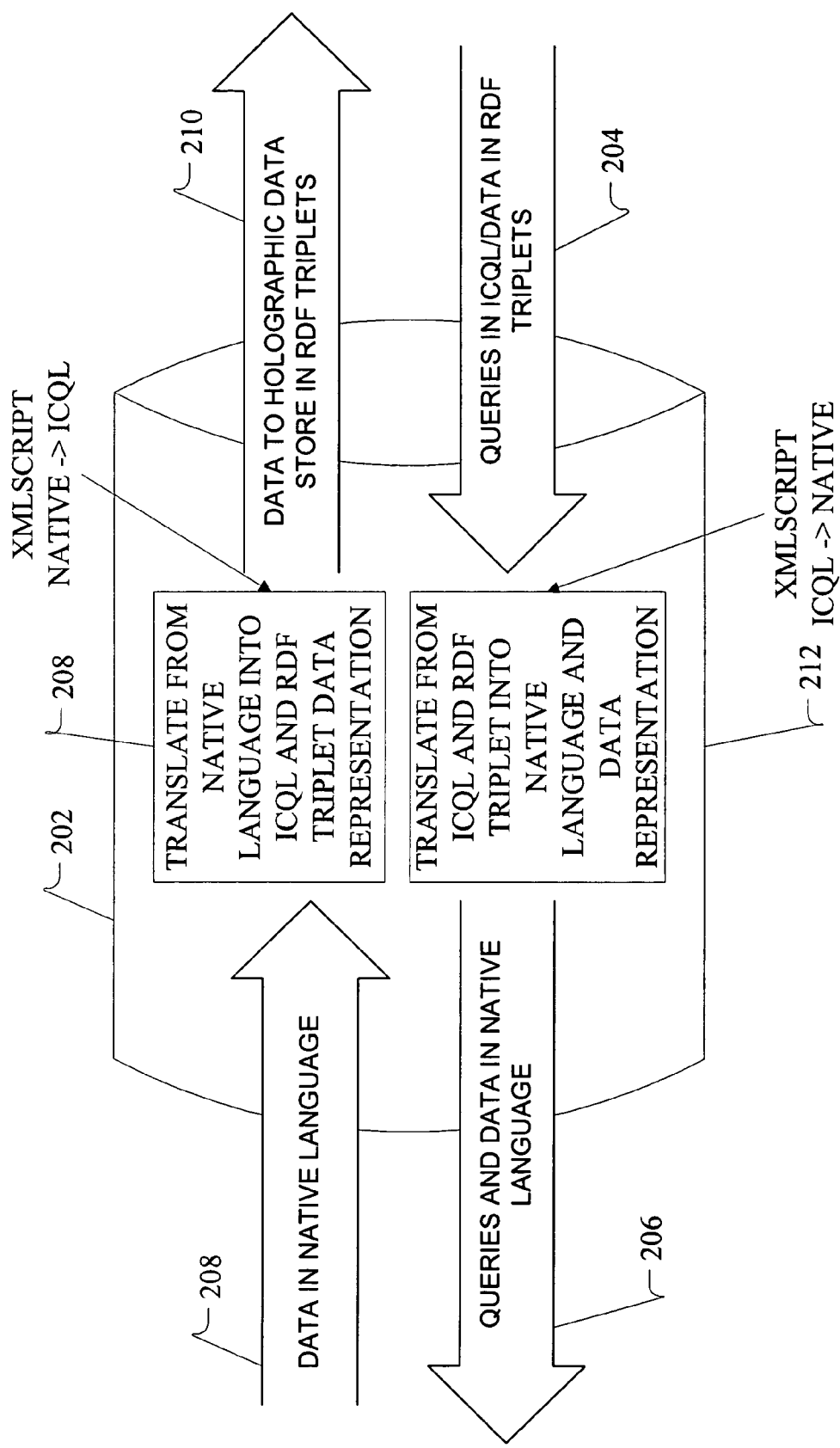

Referring to FIG. 2, the connectors translate between the API (or other interface mechanisms) of the legacy databases 140 and a language/protocol common to the connectors 108, the holographic data store 114 and the framework server 116. In the illustrated embodiment, that common language/protocol is referred to Intelligent Connector Query Language (ICQL). Thus, for example, requests generated by holographic data store 114 and routed to connector 108a in ICQL (or other language/protocol) are converted (or translated or transformed) by that connector into an appropriate API call to legacy database 140a. Likewise, messages generated by that database 140a in response to such a request are converted by the connector 108a back into ICQL (or other language/protocol).

It will be appreciated that other embodiments may use other common languages/protocols for communications between the connectors 108, the holographic data store 114 and/or the framework server 116, such as, by way of non-limiting example, extensible query language ("XQL") presented as a JDBC-like (Java Database Connectivity) API, returning JBDC result sets to a calling web page or Java program. Still further embodiments may not use a common language/protocol at all.

Figure 3:
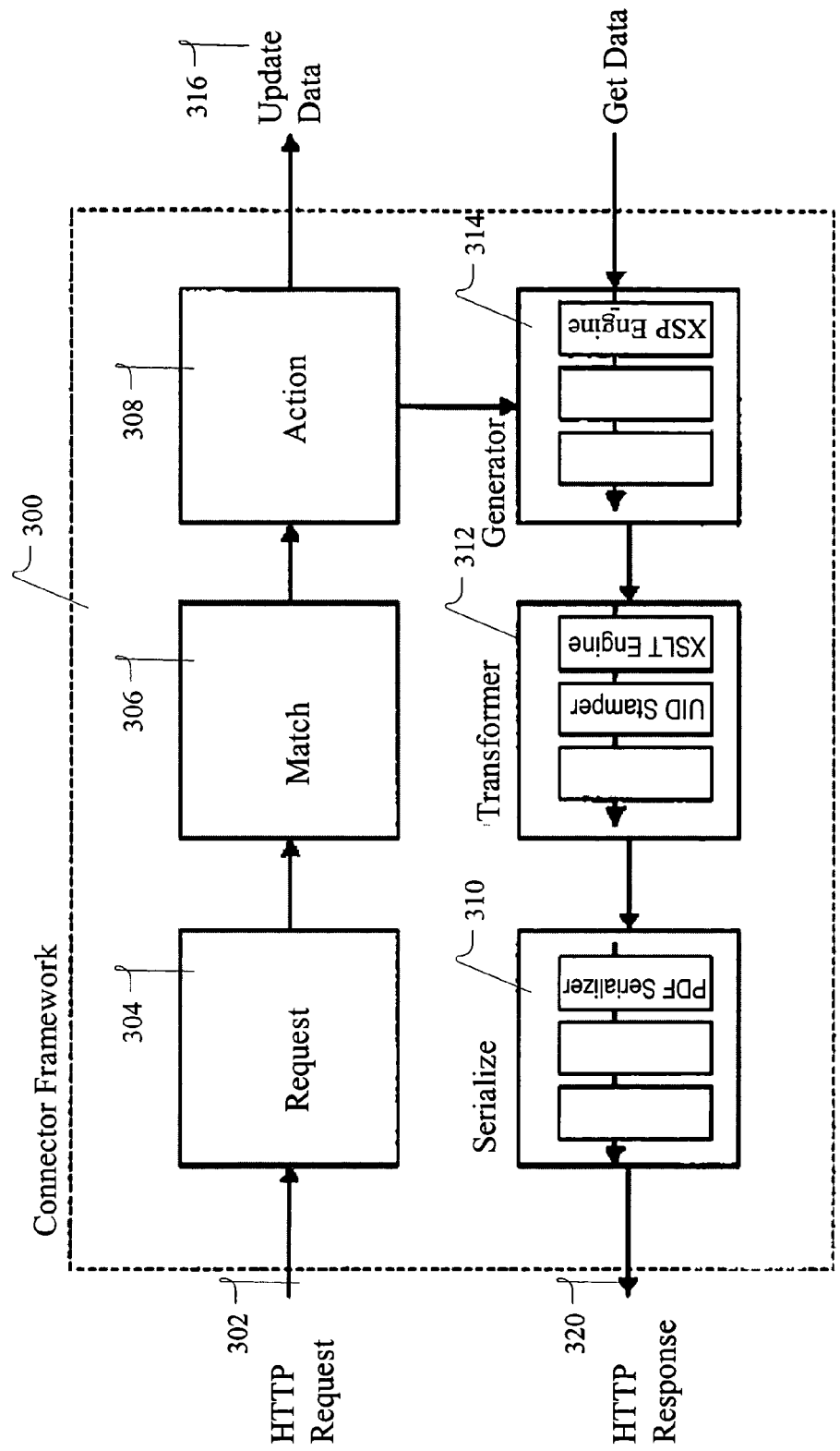
FIG. 3 depicts data flow within a connector according to the invention.
Figure 4A:
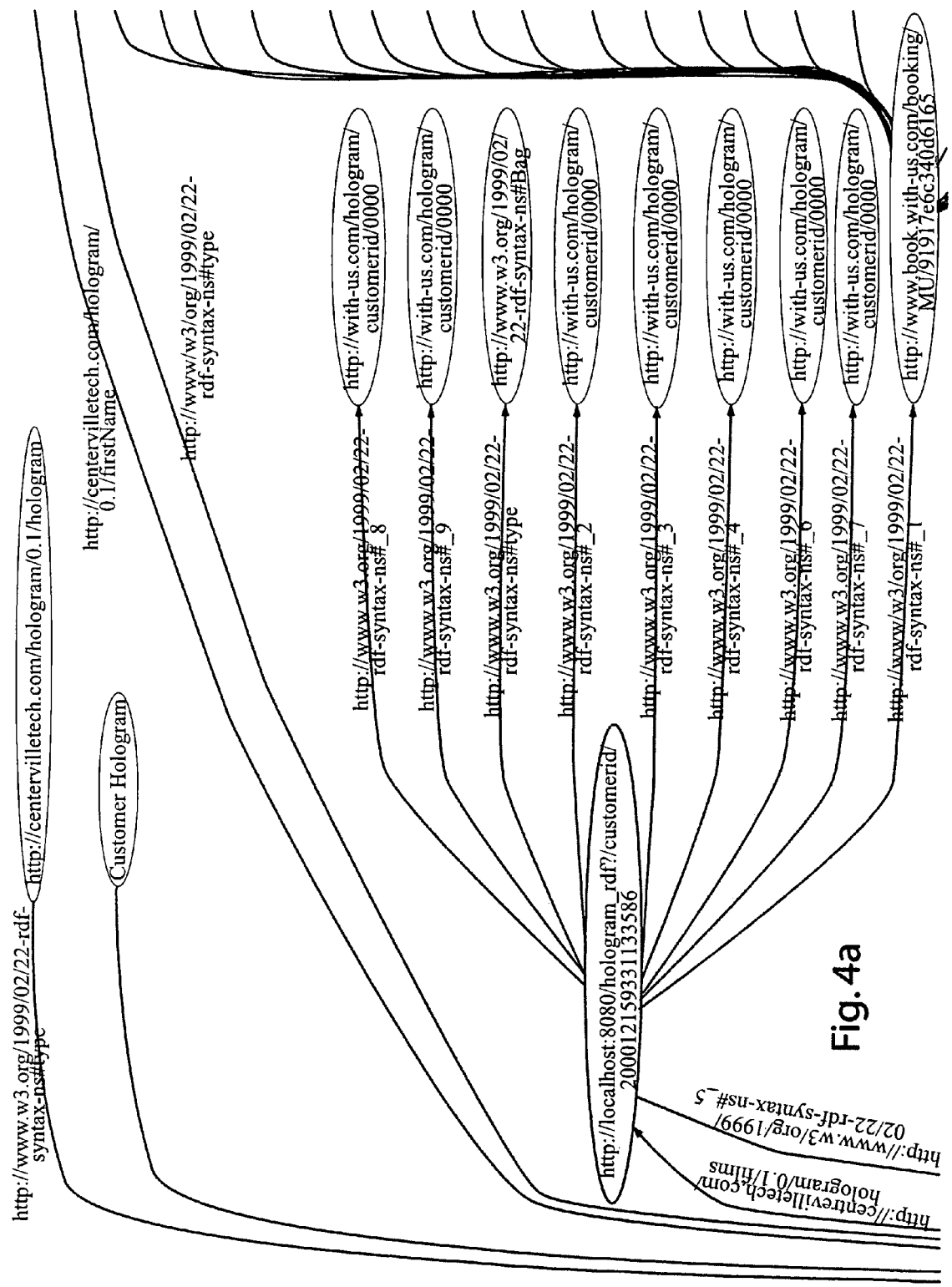
FIG. 4 depicts a directed graph representing data triples of the type maintained in a data store according to the invention.
Figure 4B:
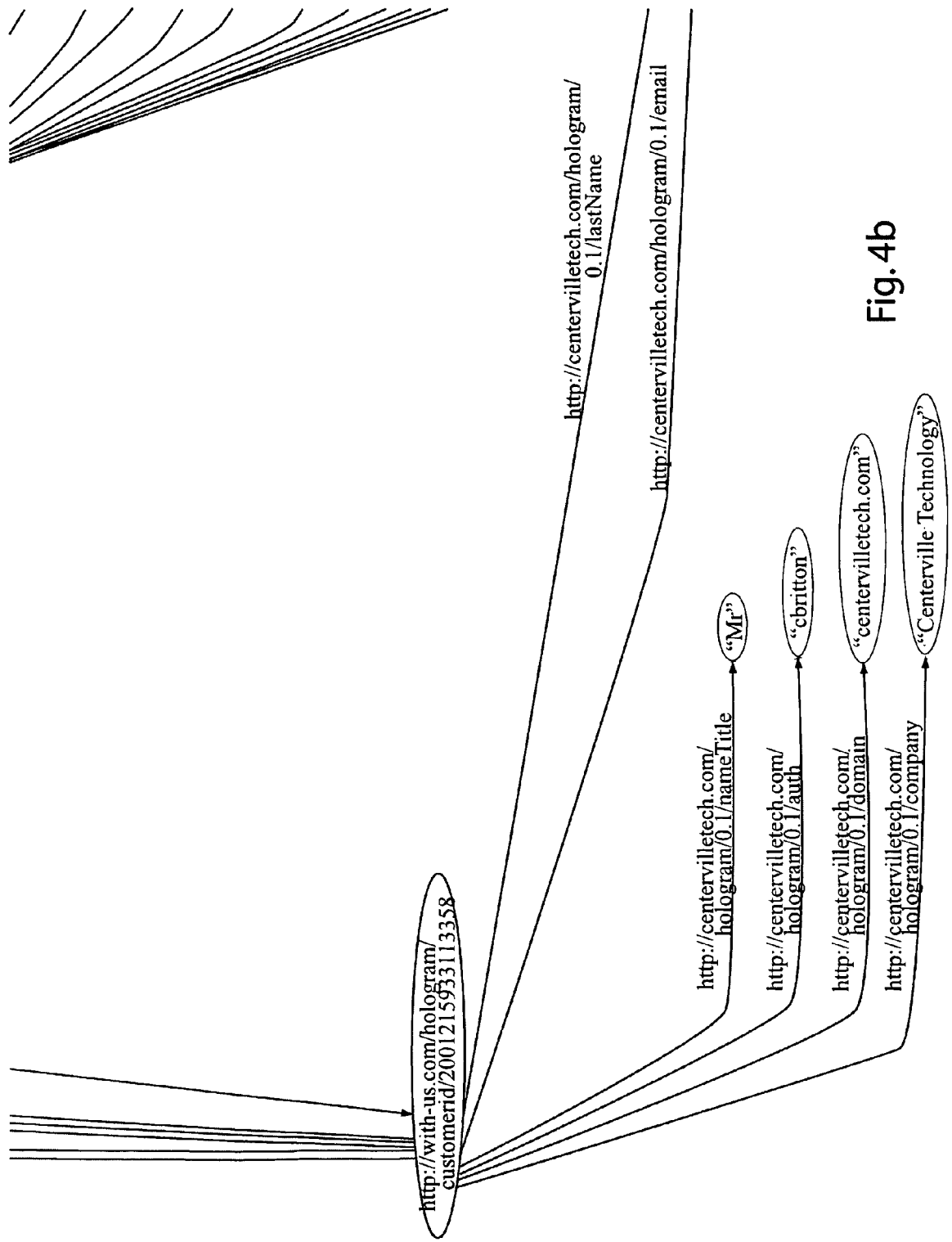
Figure 4C:
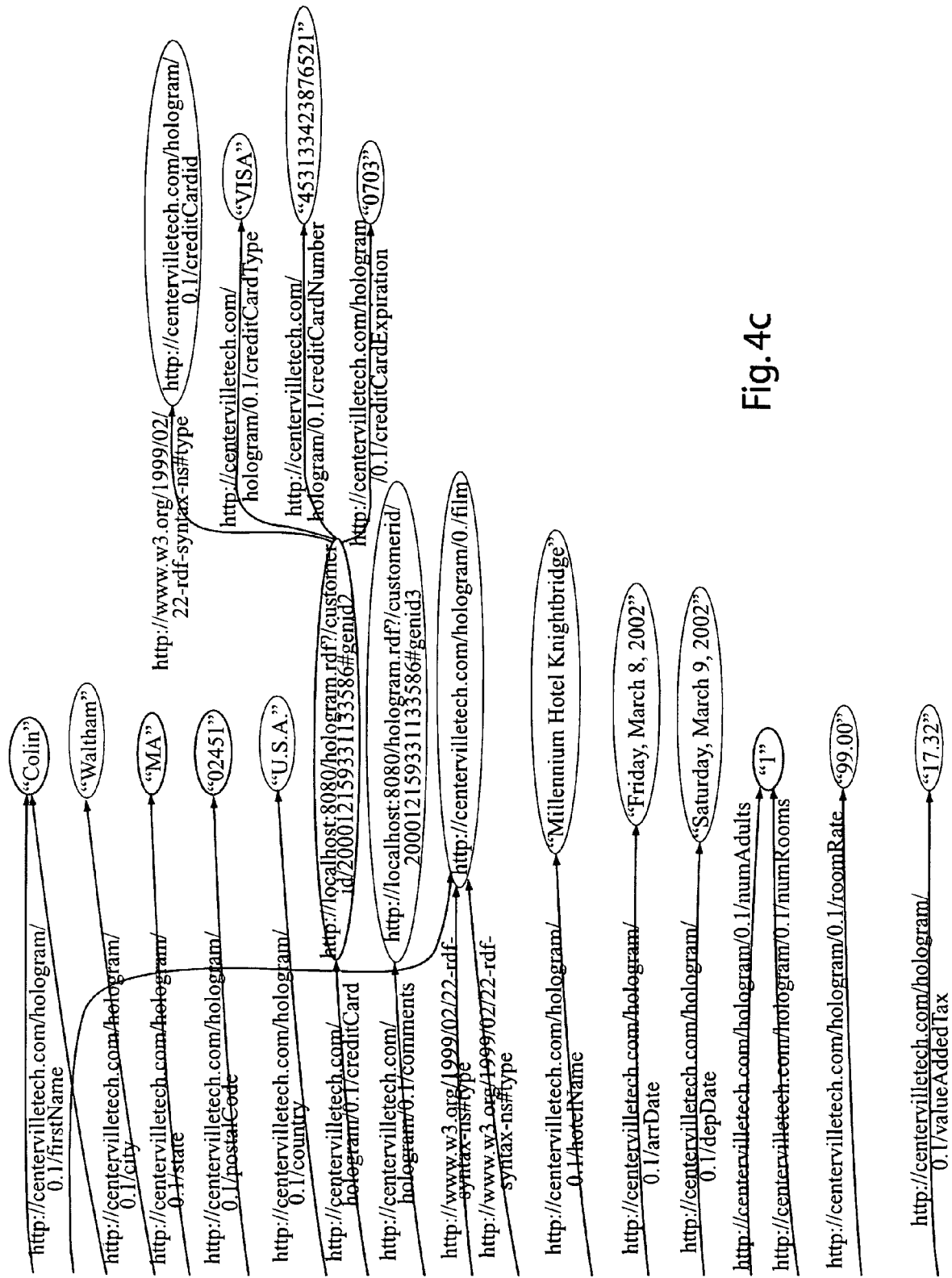
Figure 4D:
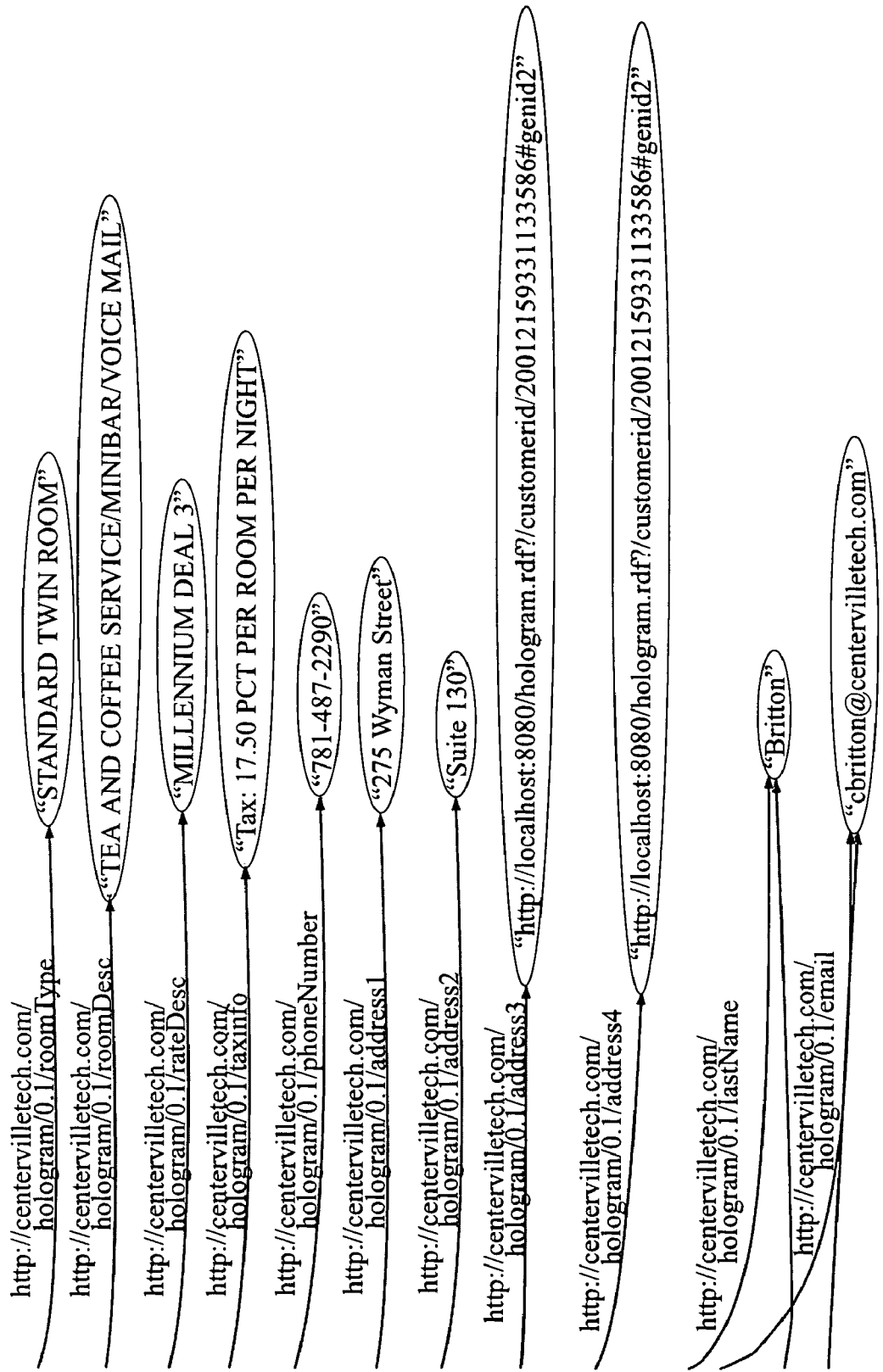

A more complete understanding of the operation of the connectors 108 may be attained by reference to FIG. 3, which shows data flow within a connector 300 according to one embodiment of the invention.

Illustrated is a connector 300 utilizing Hypertext Transfer Protocol ("HTTP") as a vehicle to transfer messages (e.g., requests and responses thereto) with holographic data store 114, such as the one illustrated in FIG. 1. Each message 302 (e.g., request) originating from the data store 115 is processed by request, match and action modules 304-308, as shown. Although these illustrated modules are specific to an extensible server page ("XSP") environment, it will be appreciated by one skilled in the art that other appropriate modules accomplishing essentially the same functions can be implemented in other types of environments.

The message is sent to the connected legacy database, e.g., 140a, using the appropriate API or other interface mechanism. It can be appreciated that the actual transformation sequence is dependent on the type of legacy database system being accessed and the method of communication between the holographic data store and the connector framework.

Messages received by the connector 300 from the legacy database are likewise processed for return to the holographic data store 114. In the illustrated example, a message 318 is received and routed to a generator module 314 which performs a transformation according to an XSP script, and then routes the message to a transformer module 312. The transformer module 302 transforms the data field contained within the message into RDF triple form suitable for the holographic data store 114 to catalog, and assigns a unique Universal Identification Number ("UID") for later conversion into a Universal Resource Locator ("URL") by the data store 114. Finally, the message is routed to a serializer module 310 and transformed for HTTP transfer to the holographic data store 320.

As can be appreciated, each such module transforms the data and passes it along the stream. The exact composition of engines/modules is specific to the underlying database. For example, if the underlying database executes using SQL, then the connector can have different engines than where the underlying database executes SAP. As such, the connectors are developed to exploit specific database query languages and thereby increase the speed and efficiency in translating protocols and seeking data.

Referring back to FIG. 1, the holographic data store 114 stores data from the legacy databases 140 and from the framework server 116 as RDF triples. The data store 114 can be embodied on any digital data processing system or systems that are in communications coupling (e.g., as defined above) with the connectors 108 and the framework server 116 capable of supporting Java® running XML/XSLT as defined above. Typically, the data store 114 is embodied in a workstation or other high-end computing device with high capacity storage devices or arrays, though, this may not be required for any given implementation.

Though the holographic data store 114 may be contained on an optical storage device, this is not the sense in which the term "holographic" is used. Rather, it refers to its storage of data from multiple sources (e.g., the legacy databases 140) in a form which permits that data to be queried and coalesced from a variety of perspectives, depending on the needs of the user and the capabilities of the framework server 116.

To this end, a preferred data store 114 stores the data from the legacy databases 140 in object-predicate-subject form, e.g., RDF triples, though those of ordinary skill in the art will appreciate that other forms may be used as well, or instead. For example, to represent the statement, "Metatomix is located in Waltham," a RDF representation would contain an object containing "Waltham," a predicate containing "location," and a subject containing "Metatomix". The predicate would be a unique pointer between the subject "Metatomix," and the object, "Waltham," and would have a tag indicating that the predicate is of type "location." In its simplest form, the example statement, is expressed in RDF as follows:

```
<rdf:description about=http://www.metatomix.com>
<lacation>Waltham</location>
</ref:description>.
```

The data store 114 can maintain the triples in literal form though, preferably, they are maintained as Uniform Resource Identifiers (hereinafter, "URI"). In some embodiments, relational databases are used to store this information. In the illustrated embodiment, however, the data items are stored in three tables using an algorithm that converts the data into unique 64-bit strings, e.g., in the manner of a "hashed with origin" approach. Those tables are maintained in a backing commercial database, such as the type commercially available from Oracle™ or others in the marketplace.

Referring to FIG. 4, the illustrated data store 114 can store—by way of non-limiting example—RDF triples representing data from marketing and/or e-commerce "legacy" databases, thus providing real-time visibility and insight into enterprise data. The figure particularly illustrates triples representing hotel reservation transactions. Each triple comprises a predicate 402, subject 406 and object 408 such that the object 408 is "linked" to its subject(s) 406 via predicate(s) 402 as explained above.

In the illustrated embodiment, each predicate 402 is assigned a URI 410 such that related data is located via URIs in a hierarchical ordering, represented for example by the directed arrow 402. If the triple is high-level 408 its URI 404 points to a lower set of triples 412, each of which has a URI 414 that may point to data or to further triples 416.

Each subject 406 contains transactional information pertaining to an enterprise resource item, e.g. credit card type, type of product bought or date. For example, as illustrated in FIG. 4, a typical subject 420 shows a value of "date of departure" related to a hotel booking transaction. It can be appreciated from one in the art that many different types of data may be contained within the subject, e.g. literal values, referenced values or additional URI's.

An object 408 contains information pertaining to the "who" of the transaction, such as the person or enterprise initiating the transaction. The object, similar to the subject, may be a literal, e.g. "Smith", or a unique identifier such as a locator address 422 such that each related predicate and subject can be referenced through the object. The identifiers are assigned by the store 114, in sequence, as each is received from the connectors. Portions of each identifier can be coded to reflect which connector the triple was received from and/or the store from which the underlying data was generated.

According to one embodiment of the invention, additional information can be stored, e.g., along with each RDF triple or on a document object basis. This can include expiry date or other adjectival data passed to the hologram store 114 by the connectors 300, e.g., in document request headers or the like, along with data collected from the legacy databases. It can also include tags added by a caching component (not shown) of the data store to reflect version numbers and Universal Unique Identifiers (UUID) or other serial numbers. This expiry and other additional information can be utilized by the hologram data store to use for caching, purging, updating and selecting collected documents and the contained triples, e.g., an internal scheduler and a determination of confidence levels as described below.

The expiry can be of various types, e.g., absolute date/time expiration or relative time expiration. One example among many is that the data expires if it has not been accessed within three hours. A data structure can also be marked as "never expires," applicable for example for a social security number. The data is also tagged with a confidence level, determined through statistical methods, to indicate its validity compared with other like data.

An internal scheduler maintains stored RDF data and deletes data that has expired according to a set of rules. Any RDF triple with a relative expiration time stamp will be deleted, for example, if the data has not been accessed for the time period specified when the data was created. System Administrators may choose not to delete old data when it expires, essentially forming a large virtual warehouse that grows larger as more data is entered. In this embodiment, the scheduler will not delete data, but rather marks the data as "stale." The confidence tag is reduced to indicate a lower confidence level forthwith, and is returned along with the data to the program requesting the data.

When a search request is applied against to the data store 114, functionality in the data store 114 checks internal data structures (stored in the data store) first. If the data is not found, a command is issued to the appropriate connector to obtain the requested data from the legacy database systems. If the latest data is not available, the most recently stored data (if available) is returned with a reduced confidence factor to indicate any expiration. In a preferred embodiment, illustrated data store 114 polls the legacy database systems 140 (via connectors 108) to obtain current information at predetermined intervals, times or otherwise.

It can be appreciated that any given transaction (or other event that gives rise to triples of the type stored in the data store 114) may be reflected in multiple legacy database systems 140. When those systems are queried by the connectors, this may result in multiple triples causing redundant or related information to be stored within the holographic store 114. A feature of the data store is the ability to form associations between different sources of data entering the data store through use of a "relationizer" module.

This can be performed by comparing sequential levels of objects and merging triples and documents (or collections) of similar objects. For example, two people at the same address and same last name may be merged into a "family" document (or collection), and so on. (Data in a triple suggesting that these might not be members of the same family could be ignored, for example, if that triple is aged or nearly expired.) The relationizer can be tailored to satisfy end-user's requirements using probabilistic, fuzzy matching and transformation rules. In this way, data storage is both minimized and related such that queries can be executed using the minimal execution time. The data store 114 can also remove redundant information from the legacy databases 140 in a similar manner dependent on the capabilities of the specific database.

A "data crusher" module further reduces the granularity or "size" of the data as time progresses and when individual datum becomes less important. The data crusher-operates in tandem with the relationizer as part of a regular data store maintenance routine.

A data mining module utilizes conventional data mining techniques to gather information from the data store 114. The module operates in batch mode or incremental mode, depending on the algorithm selected. See, for example, "Iterative Dichotomizer Tree Induction Algorithm," J. Ross Quinlan, Induction of Decision Trees, Journal of Machine Learning, Vol. 1, pgs 81-106, 1986.

The data store 114 is provided with a Web Distributed Authoring and Versioning ("WebDAV") interface to allow for documents to be added, updated and deleted from the database using secure WebDAV client tools, e.g., Microsoft Office, XML Spy or other such tools available from a variety of vendors. Additionally, or in the alternative, a system user can drag and drop onto Web folders in the Microsoft Windows Explorer environment. The interface stores presented document files in a relational database, while parsing out and storing RDF triples in the triples storage area. The interface presents the user with a view of a traversable file system. Files can be opened directly in XML editing tools or from Java programs supporting WebDAV protocols, or from processes on remote machines via any HTTP protocol on which WebDAV is based. Additionally, a WebDAV security system is utilizes to preserve data integrity and protect enterprise business data from unauthorized access.

Moreover, as noted above, the data store 114 further supports a SQL-like query language called hXQL. This allows retrieval of RDF triples matching defined criteria. The hXQL interface is presented as a JDBC-like API, returning JDBC ResultSets to a calling web page or Java program.

The data store 114 includes a graph generator (not shown) that uses RDF triples to generate directed graphs in response to queries (e.g., in ICQL form) from the framework server 116. These may be queries for information reflected by triples originating from data in one or more of the legacy databases 140 (one example might be a request for the residence cities of hotel guests who booked reservations on account over Independence Day weekend, as reflected by data from an e-Commerce database and an Accounts Receivable database). Such generation of directed graphs from triples can be accomplished in any conventional manner known the art (e.g., as appropriate to RDF triples or other manner in which the information is stored). Directed graphs generated by the data store are passed back to the server 116 for presentation to the user.

According to one practice of the invention, the data store 114 utilizes genetic, self-adapting, algorithms to traverse the RDF triples in response to queries from the framework server 116. Though not previously known in the art for this purpose, such techniques can be beneficially applied to the RDF database which, due to its inherently flexible (i.e., schema-less) structure, is not readily searched using traditional search techniques. To this end, the data store utilizes a genetic algorithm that performs several searches, each utilizing a different methodology but all based on the underlying query from the framework server, against the RDF triples. It compares the results of the searches quantitatively to discern which produce(s) the best results and reapplies that search with additional terms or further granularity.

Referring back to FIG. 1, the framework server 116 generates requests to the data store 114 (and/or indirectly to the legacy databases via connectors 108, as discussed above) and presents information therefrom to the user via browser 118. The requests can be based on ICQL requests entered directly by the user though, preferably, they are generated by the server 116 based on user selections/responses to questions, dialog boxes or other user-input controls. In a preferred embodiment, the framework server includes one or more user interface modules, plug-ins, or the like, each for generating queries of a particular nature. One such module, for example, generates queries pertaining to marketing information, another such module generates queries pertaining to financial information, and so forth.

In some embodiments, queries to the data store are structured on a SQL based RDF query language, in the general manner of SquishQL, as known in the art.

In addition to generating queries, the framework server (and/or the aforementioned modules) "walks" directed graphs generated by the data store 114 to present to the user (via browser 118) any specific items of requested information. Such walking of the directed graphs can be accomplished via any conventional technique known in the art. Presentation of questions, dialog boxes or other user-input controls to the user and, likewise, presentation of responses thereto based on the directed graph can be accomplished via conventional server/browser or other user interface technology.

In some embodiments, the framework server 116 permits a user to update data stored in the data store 114 and, thereby, that stored in the legacy databases 140. To this end, changes made to data displayed by the browser 118 are transmitted by server 116 to data store 114. There, any triples implicated by the change are updated and forwarded to the respective legacy databases 140, which utilize the corresponding API (or other interface mechanisms) to update their respective stores.

In some embodiments, the server 116 can present to the user not only data from the data store 114, but also data gleaned by the server directly from other sources. Thus, for example, the server 116 can directly query an enterprise website for statistics regarding web page usage, or otherwise.

A further understanding of the operation of the framework server 116 may be attained by reference to the appendix filed with U.S. patent application Ser. No. 90/917,264, filed Jul. 27, 2001, and entitled "Methods and Apparatus for Enterprise Application Integration," which appendix is incorporated herein by reference. Likewise, the content of FIG. 4 and the subparts hereof may be discerned from a more legible copy thereof filed with aforesaid U.S. patent application Ser. No. 90/917,264, filed Jul. 27, 2001, and entitled "Methods and Apparatus for Enterprise Application Integration," which Figure and subparts are incorporated herein by reference Described herein are methods and apparatus meeting the above-mentioned objects. It will be appreciated that the illustrated embodiment is merely an example of the invention and that other embodiments, incorporating changes to those described herein, fall within the scope of the invention, of which we claim:

The invention claim is:

1. A digital data processing method comprising:
  transforming data from a plurality of databases into resource description framework (RDF) triples,
  storing the triples in a data store, and
  traversing one or more of the triples in the data store using a genetic algorithms to identify data responsive to a query, the traversing step including
    (i) performing a plurality of searches on the data store, each search utilizing a different methodology,
    (ii) associating at least one datum returned by at least one such search with a confidence factor based on expiry information that is associated with said datum and that indicates a time of expiration of that datum,
    (iii) quantitatively comparing results of one or more of the searches, and
    (iv) discerning from the comparison one or more of the searches that produce better results and re-performing those one or more searches on the data store with any of additional terms or further granularity,
    (v) at least one of (a) returning a said confidence factor associated with a said datum to a user, and (b) using that confidence factor in said quantitative comparison.

2. The method according to claim 1, wherein the transforming step includes transforming data from a plurality of databases of disparate variety.

3. The method according to claim 2, wherein the data is any of marketing, e-commerce or transactional data.

4. The method according to claim 1, wherein the storing step includes storing the triples such that related data from the plurality of databases is represented by uniform resource indicators (URIs) in a hierarchical ordering.

5. The method according to claim 4, wherein the RDF triples each have a subject, predicate and object and wherein the storing step includes storing the triples such that through each triple's object that triple's predicate and subject are referenced.

6. A digital data processing method for real-time business visibility comprising:
  collecting any of marketing, e-commerce and transactional data from a plurality of databases, at least two of which are of disparate variety,
  storing the collected data in a schema-less data store,
  applying one or more queries to the plurality of databases in order to collect the marketing, e-commerce and transactional data,
  traversing one or more of the RDF triples in the data store using a genetic algorithms in order to identify data responsive to a query, the traversing step including,
  performing a plurality of searches on the data store, each search utilizing a different methodology,
  associating at least one datum returned by at least one such search with a confidence factor based on expiry information associated with said datum indicating a time of expiration of that datum,
  quantitatively comparing results of one or more of the searches,
  discerning from the comparison one or more of the searches that produce better results and re-performing those one or more searches on the data store with any of additional terms or further granularity,
  at least one of (i) returning said confidence factor to inform a user that the datum is old and/or has not been accessed within a specified period of time, and/or (ii) using said confidence factor as part of the quantitative comparison.

7. The digital data processing method according to claim 6, comprising
  transforming the collected data into resource description framework triples before storing it to the data store.

8. The digital data processing method according to claim 6, wherein the collecting step includes
  applying the one or more queries in accord with a data mining technique.

* * * * *

UNITED STATES PATENT AND TRADEMARK OFFICE
CERTIFICATE OF CORRECTION

PATENT NO. : 7,640,239 B2
APPLICATION NO. : 11/029164
DATED : December 29, 2009
INVENTOR(S) : Britton et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 501 days.

Signed and Sealed this

Ninth Day of November, 2010

David J. Kappos
*Director of the United States Patent and Trademark Office*